US011868151B2

(12) United States Patent
Meganathan et al.

(10) Patent No.: US 11,868,151 B2
(45) Date of Patent: Jan. 9, 2024

(54) SYSTEM FOR DYNAMIC CONTROL WITH INTERACTIVE VISUALIZATION TO OPTIMIZE ENERGY CONSUMPTION

(71) Applicant: Honeywell International Inc., Charlotte, NC (US)

(72) Inventors: Deepak Sundar Meganathan, Bangalore (IN); Soumen Ghosh, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/701,121

(22) Filed: Mar. 22, 2022

(65) Prior Publication Data
US 2022/0214708 A1    Jul. 7, 2022

Related U.S. Application Data

(63) Continuation of application No. 17/029,578, filed on Sep. 23, 2020, now Pat. No. 11,327,518, which is a
(Continued)

(51) Int. Cl.
*G05F 1/00* (2006.01)
*G05F 1/66* (2006.01)
(Continued)

(52) U.S. Cl.
CPC ............. *G05F 1/66* (2013.01); *G05B 13/041* (2013.01); *G05B 15/02* (2013.01); *G06Q 50/06* (2013.01);
(Continued)

(58) Field of Classification Search
CPC .... G05B 15/02; G05B 13/041; G05B 19/418; G05B 2219/2639; G05B 2219/2642; G06Q 50/06; G05F 1/66
See application file for complete search history.

(56) References Cited

U.S. PATENT DOCUMENTS 8,196,085 B1    6/2012 Milton
2003/0147186 A1*    8/2003 Schultz ................... H02P 9/107
361/15
(Continued)

FOREIGN PATENT DOCUMENTS

EP    2292986 A2    3/2011
JP    2014082811 A    5/2014

OTHER PUBLICATIONS

Schwartz, "A Block-By-Block Look at the Energy Consumption of New York's Buildings," available at http://www.fastcoexist.com/1679249/a-block-by-block-look-at-the-energy-consumption-of-new-yorks-buildings, 6 pages, printed Jun. 8, 2016.
(Continued)

*Primary Examiner* — Tuan C Dao
(74) *Attorney, Agent, or Firm* — Seager, Tufte & Wickhem, LLP (57) ABSTRACT

A system for controlling energy consumption. The system may incorporate devices configured on a floor map, a monitor that detects energy consumption by each device, a heat map shown on the floor map, a processor, and a user interface having a display connected to the processor. The heat map may indicate energy consumption in various areas of the floor plan. The floor map with the heat map may be a screen on the display. The energy consumption by each of the devices from the monitor may be calculated by the processor in time that each device is active and in a power rating of the respective device. The energy consumption by each of the devices may be converted by the processor into cost. From a screen, a user may define a virtual and dynamic zone to optimize and control the energy consumption.

19 Claims, 13 Drawing Sheets

Related U.S. Application Data continuation of application No. 16/290,349, filed on Mar. 1, 2019, now Pat. No. 10,809,754, which is a continuation of application No. 14/883,521, filed on Oct. 14, 2015, now Pat. No. 10,248,146.

(51) Int. Cl.
  *G05B 15/02* (2006.01)
  *G06Q 50/06* (2012.01)
  *G05B 13/04* (2006.01)

(52) U.S. Cl.
  CPC ............... *G05B 2219/2639* (2013.01); *G05B 2219/2642* (2013.01)

(56) References Cited

U.S. PATENT DOCUMENTS

| | | | |
|---|---|---|---|
| 2003/0233201 A1 | 12/2003 | Horst et al. | |
| 2004/0158541 A1 | 8/2004 | Notarianni et al. | |
| 2006/0149144 A1 | 7/2006 | Lynn et al. | |
| 2006/0161270 A1 | 7/2006 | Luskin et al. | |
| 2007/0219645 A1* | 9/2007 | Thomas | G05B 15/02 700/29 |
| 2008/0221755 A1* | 9/2008 | Senda | H02J 7/1438 701/36 |
| 2009/0077407 A1 | 3/2009 | Akimoto | |
| 2009/0210814 A1* | 8/2009 | Agrusa | G06F 11/324 700/83 |
| 2009/0243517 A1 | 10/2009 | Verfuerth et al. | |
| 2009/0310022 A1* | 12/2009 | Sakanoue | G09G 3/3406 348/E5.062 |
| 2010/0071975 A1* | 3/2010 | Aoki | B60W 10/08 180/65.285 |
| 2011/0235108 A1* | 9/2011 | Kato | G06F 3/1218 358/1.15 |
| 2012/0006525 A1* | 1/2012 | Lafleur | F24F 11/64 165/238 |
| 2012/0049639 A1* | 3/2012 | Besore | G01K 3/005 307/97 |
| 2012/0139503 A1 | 6/2012 | Saeki et al. | |
| 2012/0245748 A1* | 9/2012 | Kumar | F02C 3/28 700/288 |
| 2012/0265357 A1 | 10/2012 | Song et al. | |
| 2012/0280827 A1 | 11/2012 | Kashiwagi et al. | |
| 2012/0296488 A1 | 11/2012 | Dharwada et al. | |
| 2013/0016106 A1 | 1/2013 | Yip et al. | |
| 2013/0030576 A1* | 1/2013 | Drew | G06Q 50/06 700/276 |
| 2013/0151012 A1 | 6/2013 | Shetty et al. | |
| 2013/0206177 A1 | 8/2013 | Burlutskiy | |
| 2013/0339757 A1 | 12/2013 | Reddy | |
| 2014/0046722 A1 | 2/2014 | Rosenbloom et al. | |
| 2014/0094979 A1 | 4/2014 | Mansfield | |
| 2014/0180968 A1* | 6/2014 | Song | G06Q 50/06 340/870.03 |
| 2014/0222230 A1 | 8/2014 | Shimizu et al. | |
| 2015/0062186 A1 | 3/2015 | Park | |
| 2015/0066221 A1* | 3/2015 | Weaver | G05B 15/02 700/295 |
| 2015/0127181 A1 | 5/2015 | Sako et al. | |
| 2016/0358722 A1 | 12/2016 | Lakshmanan et al. | |
| 2018/0145533 A1 | 5/2018 | Tian et al. | |

OTHER PUBLICATIONS https://www.nngroup.com/articles/emotional-design-fail/, "Emotional Design Fail: Divorcing My Nest Thermostat," 10 pages, printed Jun. 8, 2016.

The Extended European Search Report for EP Application Serial No. 16193603.4, dated Mar. 10, 2017.

* cited by examiner

SYSTEM FOR DYNAMIC CONTROL WITH INTERACTIVE VISUALIZATION TO OPTIMIZE ENERGY CONSUMPTION

This application is a continuation of U.S. patent application Ser. No. 17/029,578, filed Sep. 23, 2020, now U.S. Pat. No. 11,327,518, which is a continuation of U.S. patent application Ser. No. 16/290,349, filed Mar. 1, 2019, now U.S. Pat. No. 10,809,754, which is a continuation of U.S. patent application Ser. No. 14/883,521, filed Oct. 14, 2015, now U.S. Pat. No. 10,248,146. U.S. patent application Ser. No. 14/883,521, filed Oct. 14, 2015, is hereby incorporated by reference. U.S. patent application Ser. No. 16/290,349, filed Mar. 1, 2019, is hereby incorporated by reference. U.S. patent application Ser. No. 17/029,578, filed Sep. 23, 2020, is hereby incorporated by reference.

BACKGROUND

The present disclosure pertains to devices in a space that use energy and particularly to ways of controlling energy consumption by the devices.

SUMMARY

The disclosure reveals a system and approach for monitoring and controlling energy consumption. The system may incorporate one or more devices configured on a floor map or site map or BIM or 3D model, a monitor that detects energy consumption by each of the one or more devices, a heat map or other visualization shown on the floor map, a processor, a user interface having a display connected to the processor, and a wearable such as a watch or a body-attached device. The heat map may indicate energy consumption in various areas of the floor plan or other structure layout. Levels of energy consumption may be indicated by color, shades or patterns of the same color, and so on. The floor map or other kind of layout with the heat map may be a screen showable on the display. The floor map or other representative layout may be that of a home, office building, factory, hospital, airport, casino, apartment, commercial building, and so forth. A user may have a choice of the kind of layout, representation of level of energy consumption, and the like to have displayed. The energy consumption by each of the one or more devices from the monitor may be calculated by the processor in terms of time that each device is active and in terms of a power rating of the respective device. The energy consumption by each of the one or more devices may be converted by the processor into cost.

DESCRIPTION

The present system and approach may incorporate one or more processors, computers, wearable devices, controllers, user interfaces, wireless and/or wire connections, and/or the like, in an implementation described and/or shown herein.

This description may provide one or more illustrative and specific examples or ways of implementing the present system and approach. For example, the system and approach may be described in terms of a home and heat map on a floor plan. There may be numerous other examples or ways of implementing the system and approach on various kinds of structures.

The system may incorporate one or more devices configured on a floor map, site map, BIM or 3D model, a monitor that detects energy consumption by each of the one or more devices, a heat map or other visualization shown on the floor map, a processor, a user interface having a display connected to the processor, and a wearable such as a watch. The heat map may indicate energy consumption in various areas of the floor plan or other structure layout. Levels of energy consumption may be indicated by color, shades or patterns of the same color, and so on. The floor map or other kind of layout with the heat map may be a screen showable on the display. The floor map or other representative layout may be that of a home, office building, factory, hospital, airport, casino, apartment, commercial building, and so forth. A user may have a choice of the kind of layout, representation of level of energy consumption, and the like to be displayed.

Residential homes, as instances, may have a home automation system integrated with security subsystem. Homes may have energy consumption control in a house related to activation and deactivation of the sensors, and devices attached to the automation system. Devices may include sensors. Devices that are attached to the system may be like door and window sensors, window blinds, door locks, lights, thermostat (cooling and heating unit), garage door controls, refrigerator, fans, electric iron, water heater, washing machine, cameras, smoke/gas detectors, coffee maker, microwave, dishwasher, televisions, and so on. Some of these devices are also connected via binary switches. Some systems may give details about the overall energy consumption of the house. Some systems may try to learn a trend and try to force a setting in the system to optimize the energy consumption but can compromise a user's comfort or take time to change the comfort settings. So there appears to be a need for a solution that gives full control to a user on giving flexible, instant and dynamic options to the user to measure and optimize the energy consumption. There appears no necessarily easy and interactive approach to visualize the energy/power consumption by the connected home system, by devices and sensors or by zone/area. There appears a lack of a dynamic option to optimize the energy consumption, and a lack of control by an end user relative to energy optimization options.

The present system and approach may work by visualizing energy consumption of the individual connected with home system's devices and sensors or by zone on the interactive floor map and give an option to user to dynamically adjust or reduce energy consumption by percentage and time. Virtually all connected home sensors and devices may be configured on a floor map.

Over a period of time, the floor map may show a heat map (which may be color coded) or other visualization to indicate energy consumption in different parts of the home or according to individual devices. Energy consumption by individual sensors and devices may be calculated by monitoring the active time and power rating, (watts per day (hours), convert it to kilowatts, usage over a month (days) and calculate the cost). Energy consumption on each device or zone may be viewed by hours, days, weeks, months, or years on the map view. Energy consumption on each device or zone may be shown as, for example, a cost/currency value in dollars, watt-hours per day, kWh per day, and so on.

A user may select a heat map region or individual device or can define dynamic region on the floor map to adjust the energy consumption by percentage and by time. If user selects a region and says to reduce consumption in the area by ten percent, then the system may internally change set points to optimize the consumption like dimming lights, adjusting thermostat set points, reducing the fan speed, and so on. A user may also set a duration for setting changes in that, for example, a setting may be applicable for next three hours or one day, and so on.

A timeline may be shown on the map view and upon selecting a different time of the day, the heat map may get updates, and thus the user can clearly see the trend/changes from minutes to weeks and so on.

The present system may show and hide the savings that can be achieved by doing dynamic and time based adjustments, by showing money that will be saved with dynamic feedback from a system. The system may generate recommendations and notifications to user to optimize the energy consumption and based on a user's acknowledgement, the system may automatically reduce energy consumption by, for instance, five percent, which can be configurable. The system may be extended to a mobile device and cloud platform.

Figure 1:
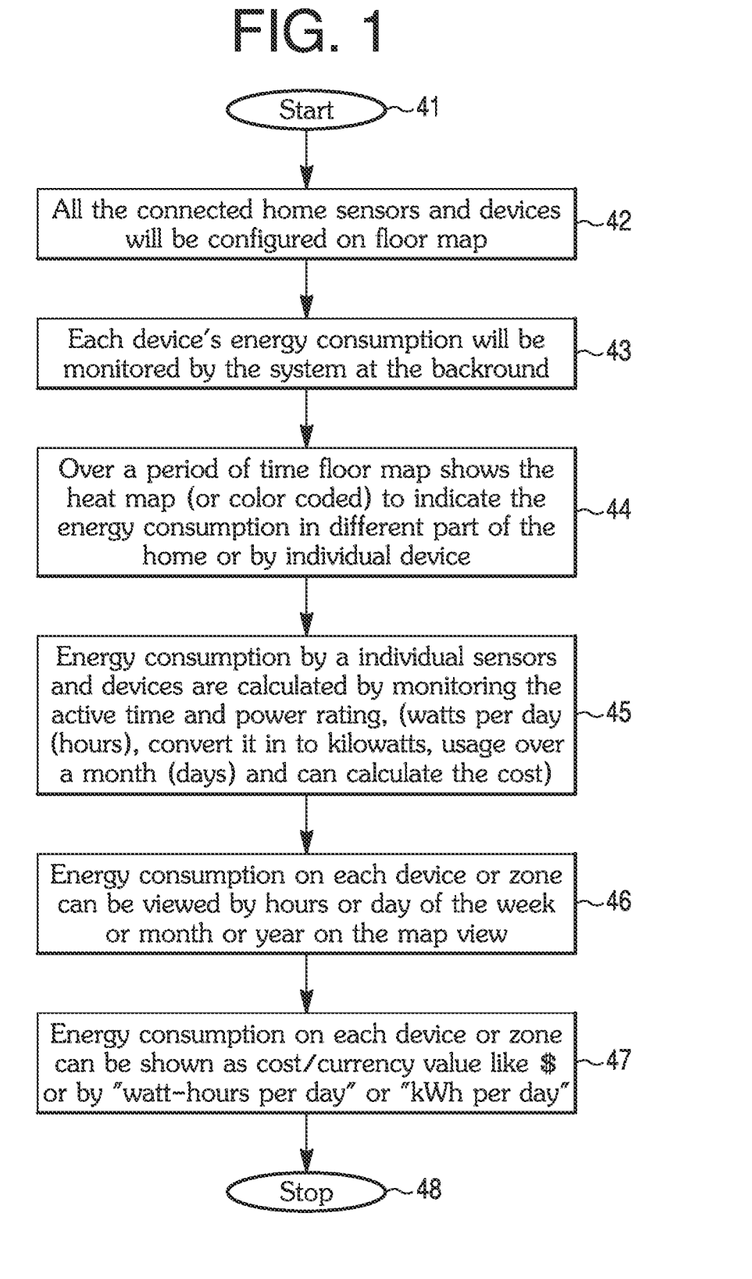
FIG. 1 is a diagram that exhibits a flow that visualizes energy consumption on a map.

FIG. 1 is a diagram that is a solution flow that visualizes energy consumption on a map. One may start at symbol 41 and at symbol 42, connected home sensors and devices may be configured on a floor map. The configuring of the sensors and devices may extend to buildings and large premises. Each device's energy consumption may be monitored by a system at the background as indicated in symbol 43. Over a period of time, a floor map may show a heat map (color, pattern, shade coded, and so on) to indicate energy consumption in different parts of a home or by individual device, according to symbol 44.

Energy consumption by individual sensors and devices may be calculated by monitoring the active time and power (in watts per day or hour) and converting the time and power rating to kilowatts, usage over a month or days, and calculating the cost, as noted in symbol 45. Energy consumption on each device or zone can be viewed by hours, day, week, month or year on a map view in view of symbol 46. Optionally, a timeline may be shown on a map view, and upon selecting a different time of the day, the heat map may get updates, and thus the user may clearly see the trend and changes from minutes to weeks, and so on. Symbol 47 may indicate that energy consumption on each device or zone can be shown as cost/currency value like dollars or by "watt-hours per day" or "kWh per day". The solution flow may end at symbol 48.

Figure 2:
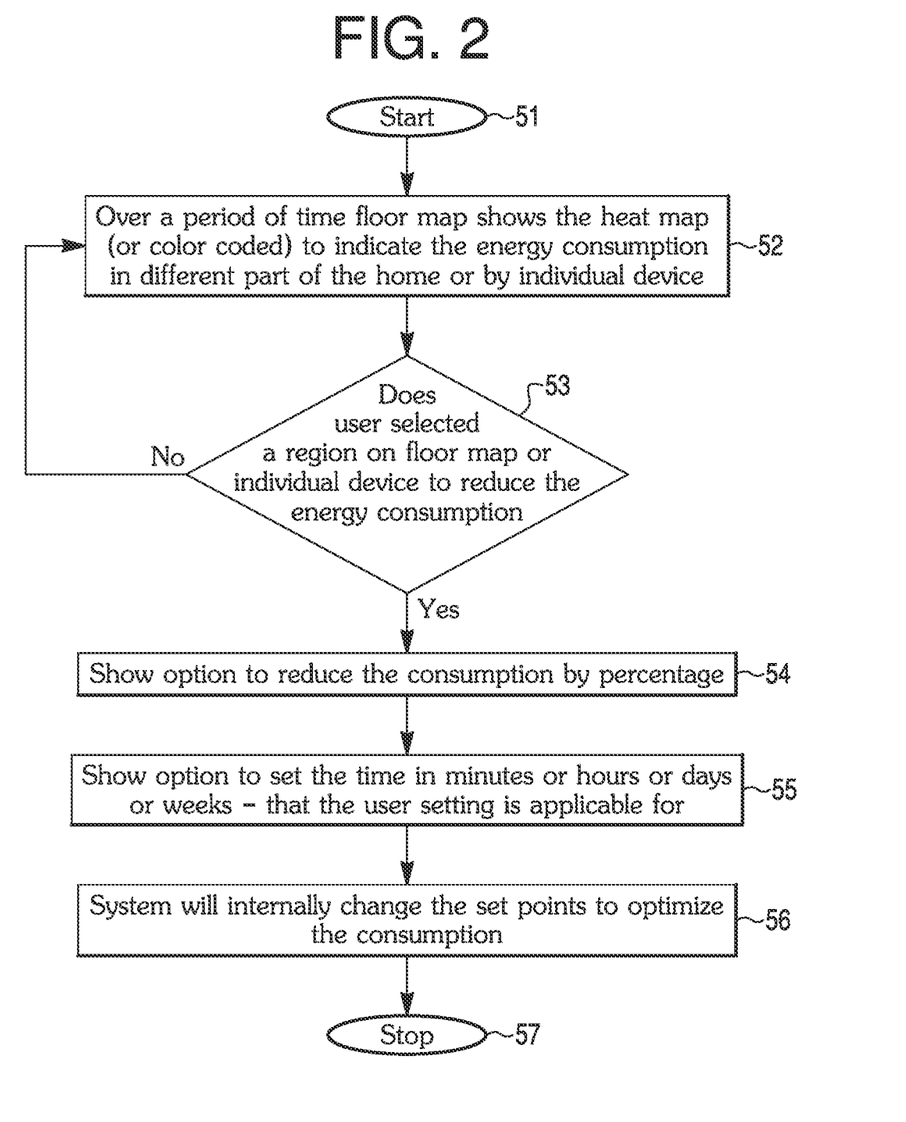
FIG. 2 is a diagram of a solution flow that may define a virtual region and control energy consumption.

FIG. 2 is a diagram of a solution flow that may define a virtual region and control energy consumption. From a symbol 51 at a start, one may go to symbol 52 where over a period of time, a floor map may show a heat map (color coded) to indicate energy consumption in different parts of the home or by individual device. At symbol 53, a question of whether a user selects a region on a floor map or an individual device to replace energy consumption or not. If an answer is no, then a return to symbol 52 may be made for its content to be repeated. If the answer is yes, then an option to reduce the consumption by a percentage may be shown at symbol 54. An option to set the time in minutes, hours, days or weeks, for which a user setting is applicable, may be shown in symbol 55. At symbol 56, a system may internally change set points to optimize the consumption. For instance, if a user selects a region and says reduce consumption by ten percent, the system may internally change the set points to optimize the consumption like dimming lights, adjusting thermostat setpoints, reducing a fan speed, and so on. The user may also set a duration for the changes (in that a setting can be indicated to be applicable, for example, three hours, one day, and so on). The solution flow may end at symbol 57.

Figure 3:
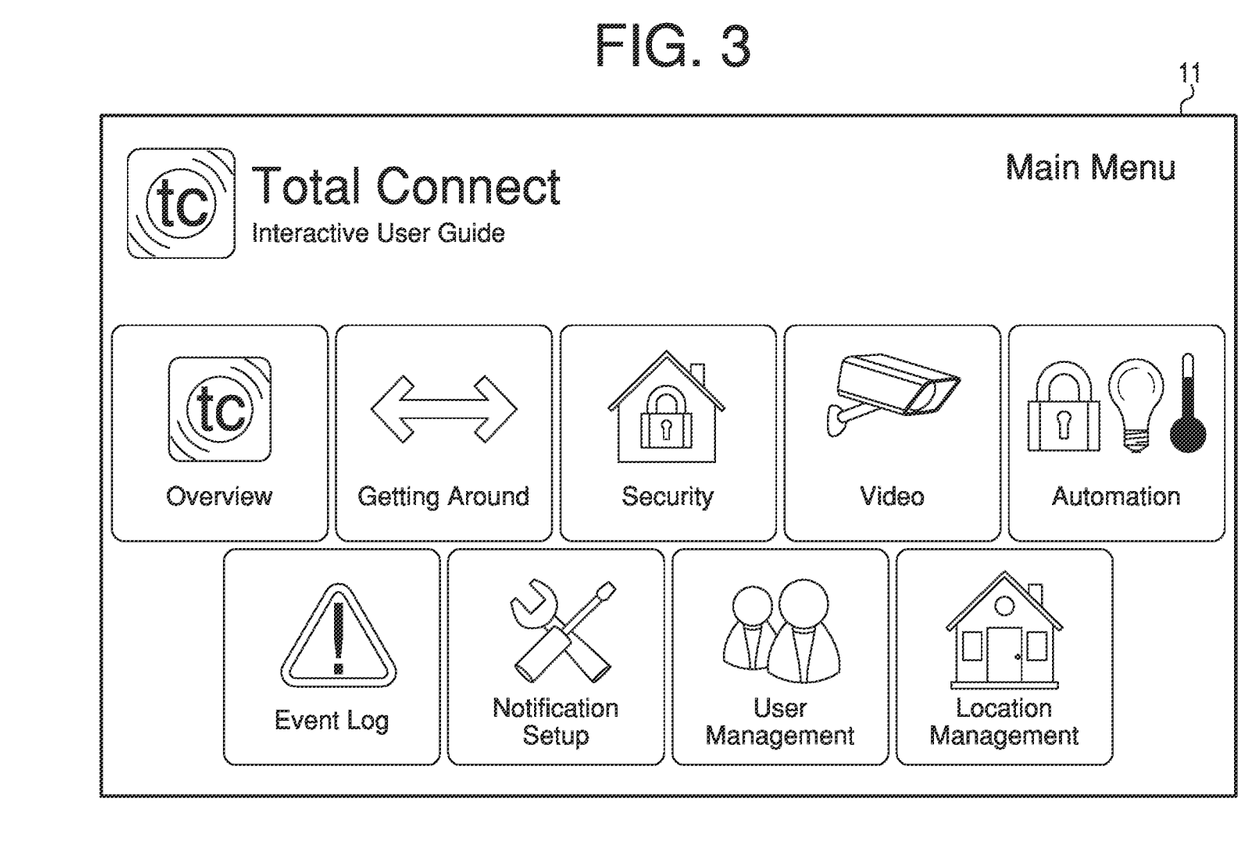
FIG. 3 is a diagram of a screen of a main menu of a subsystem for a home or commercial building in terms of energy consumption.
Figure 4:
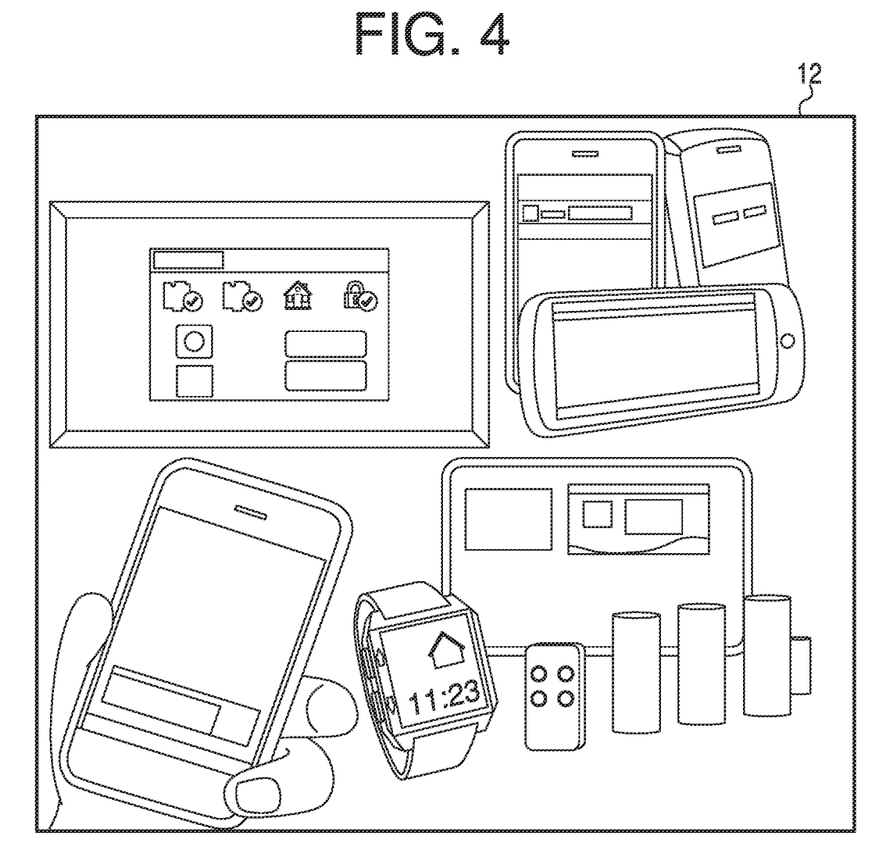
FIG. 4 is a diagram that reveals smart phones, tablets and the like for controlling remotely the subsystem.
Figure 5:
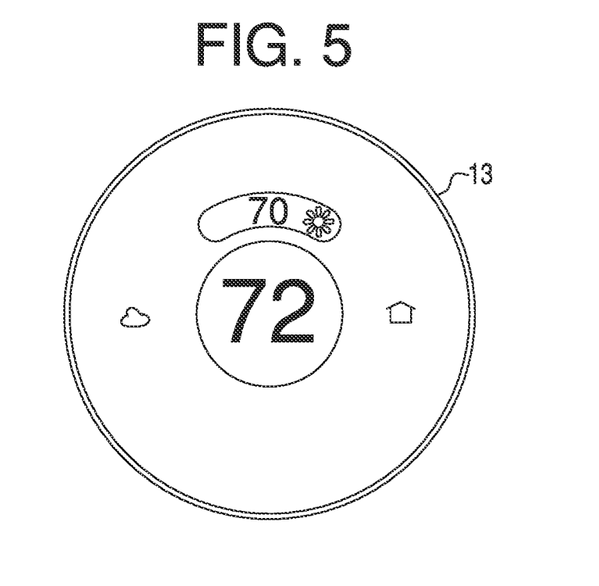
FIGS. 5 and 6 are diagrams of example thermostats and that may be part of local control of the subsystem.
Figure 6:
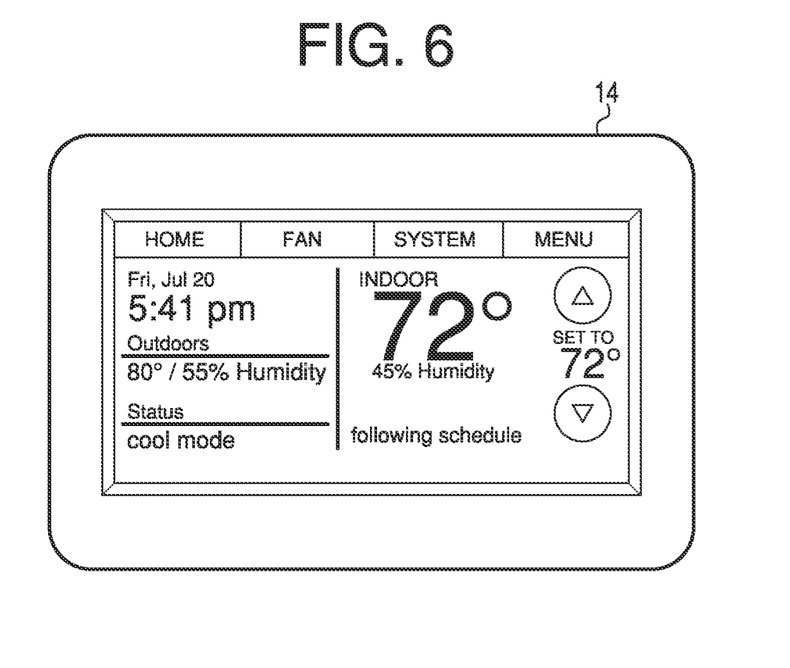
Figure 7:
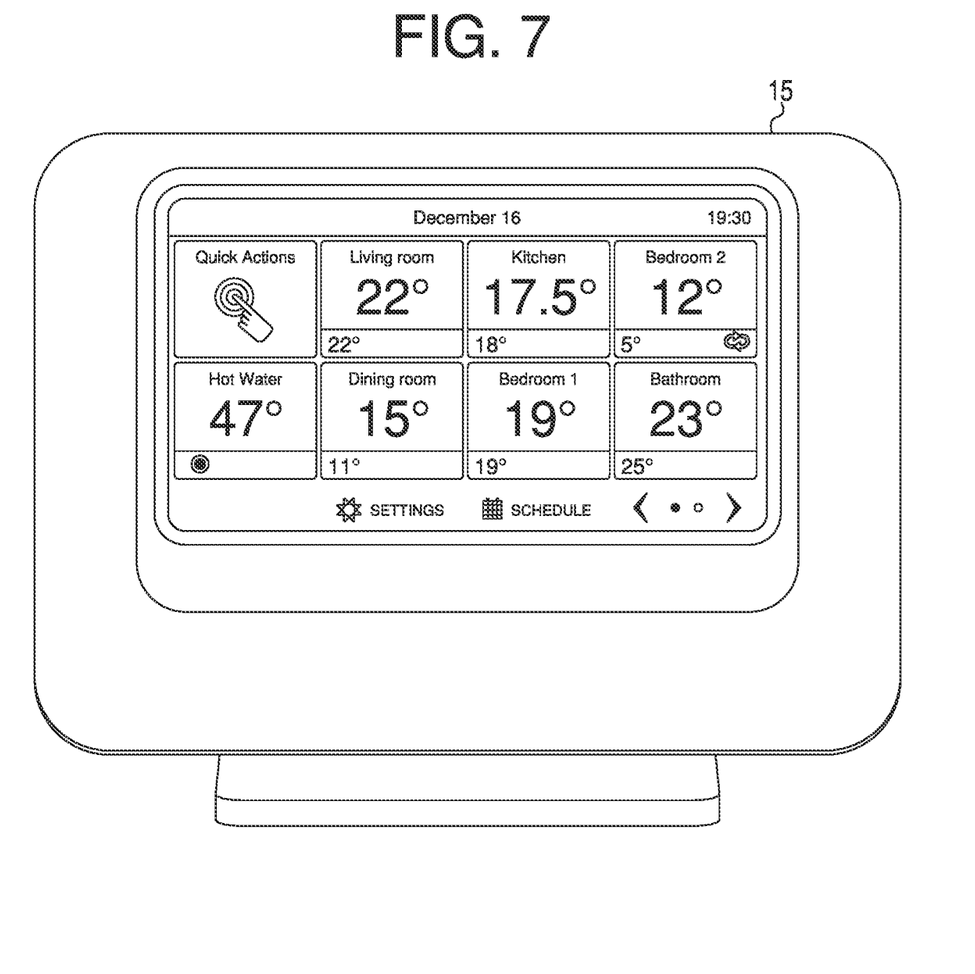
FIG. 7 is a diagram of a console with a display of temperatures in various rooms of a house, of hot water, and more.

FIG. 3 is a diagram of a screen of a main menu 11 of a subsystem for a home or commercial building in terms of energy consumption. FIG. 4 is a diagram 12 that reveals smart phones, tablets, wearable devices, and the like for controlling remotely the subsystem. FIGS. 5 and 6 are diagrams of example thermostats 13 and 14 that may be part of local control of the subsystem. FIG. 7 is a diagram of a console with a display of temperatures in various rooms of a house, of hot water, and more. The items of FIGS. 3-7 may contribute to dynamic control of a connected home subsystem by interactive visualization to optimize energy consumption.

Energy consumption may be calculated. For example, a living room light may be in an ON state for 11 hours a day on the average. This information may be read from the system's activity data, user action data and overall history data. One may assume that energy consumption by the living room light is 40 watts. A formula to calculate the energy consumption may be 40 watts×11 hours=440 watt-hours for 11 hours in a day, 440 watt-hours for 11 hours a day/1000=0.44 kWh per 11 hours in a day, 0.44 kWh per 11 hours in a day×30 days=13.2 kWh per month, and 13.2 kWh per month×$0.10 per kWh=$1.32 per month.

Figure 8:
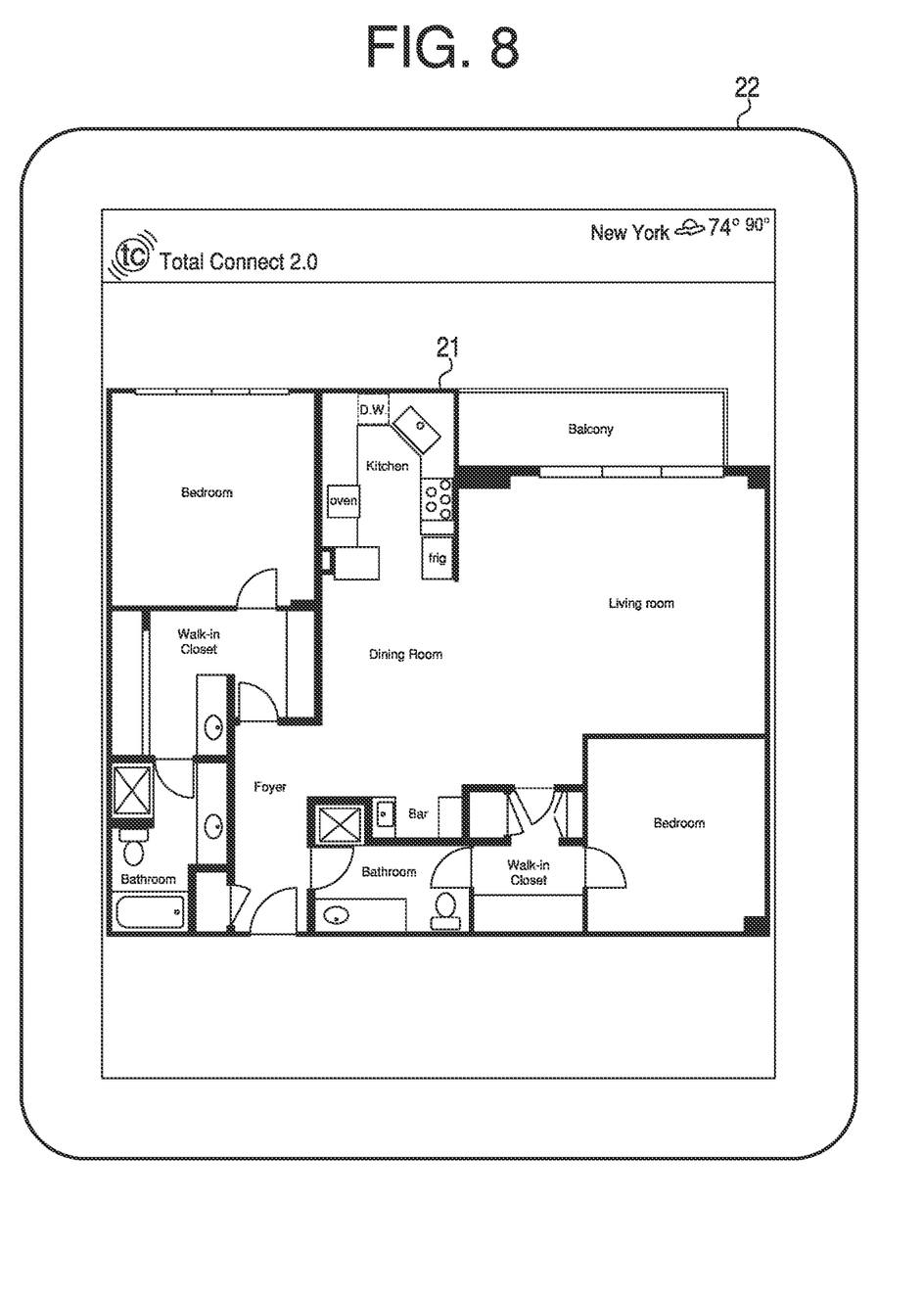
FIG. 8 is a diagram of visualization of a system described as a user selects an intended floor map.
Figure 9:
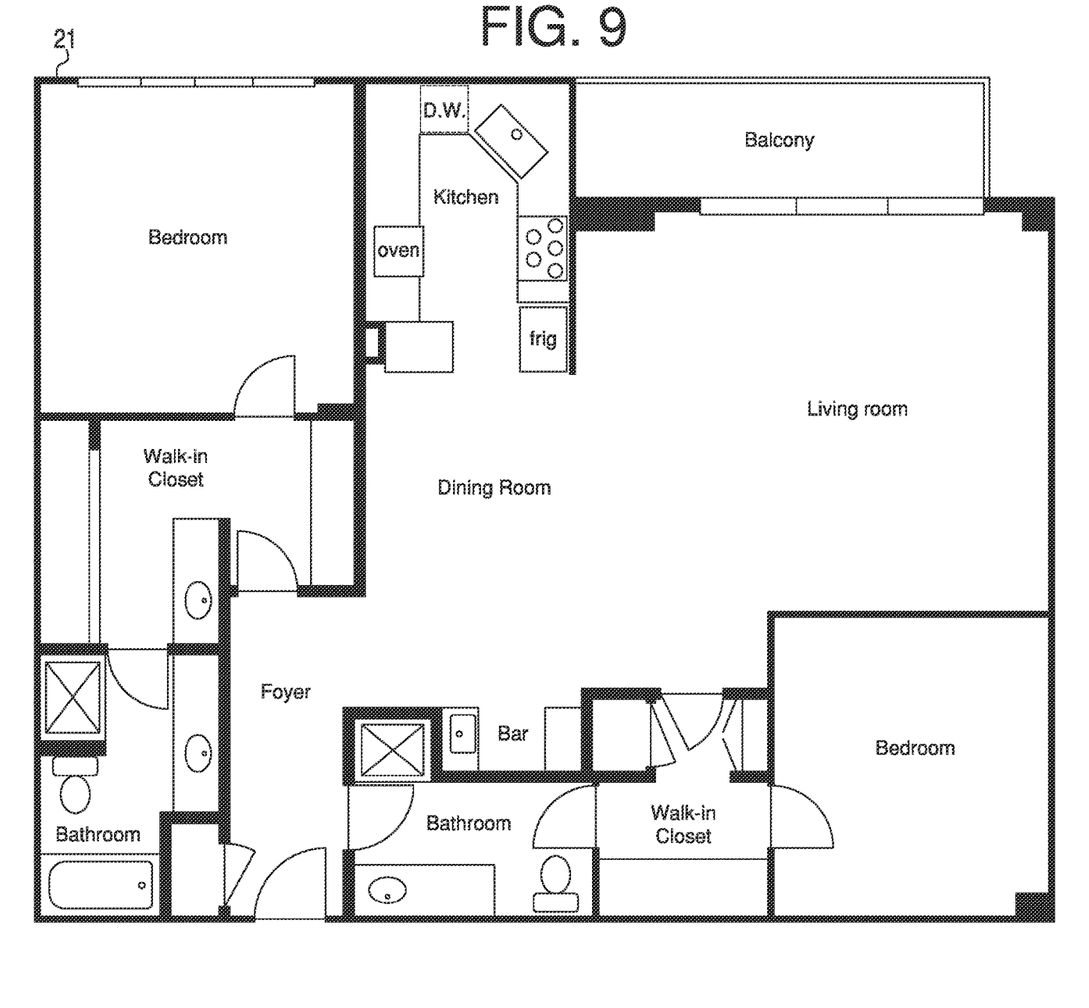
FIG. 9 is a diagram of devices configured on floor map from a list.
Figure 10:
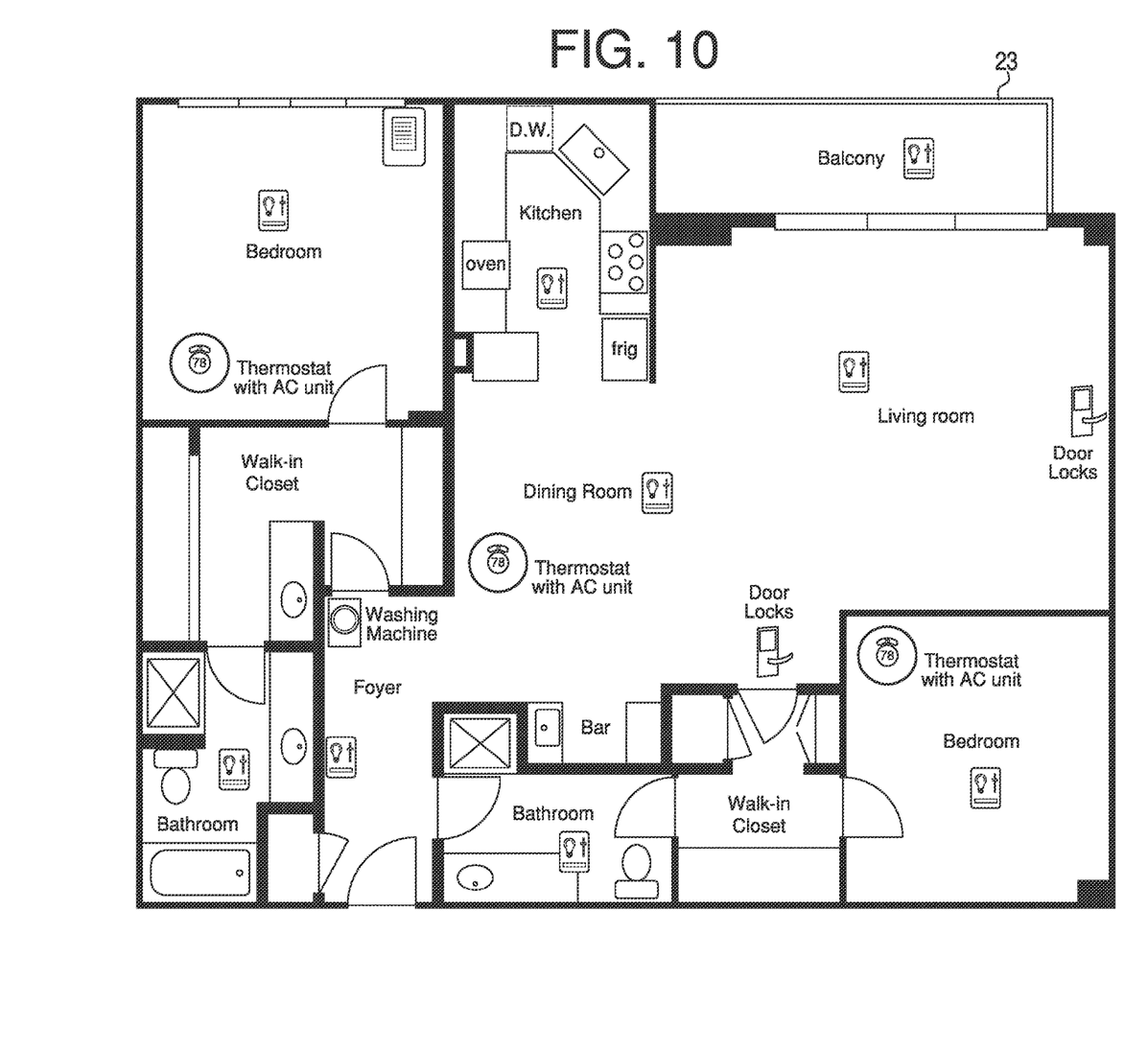
FIG. 10 is a diagram of energy consumption details on a floor map.
Figure 11:
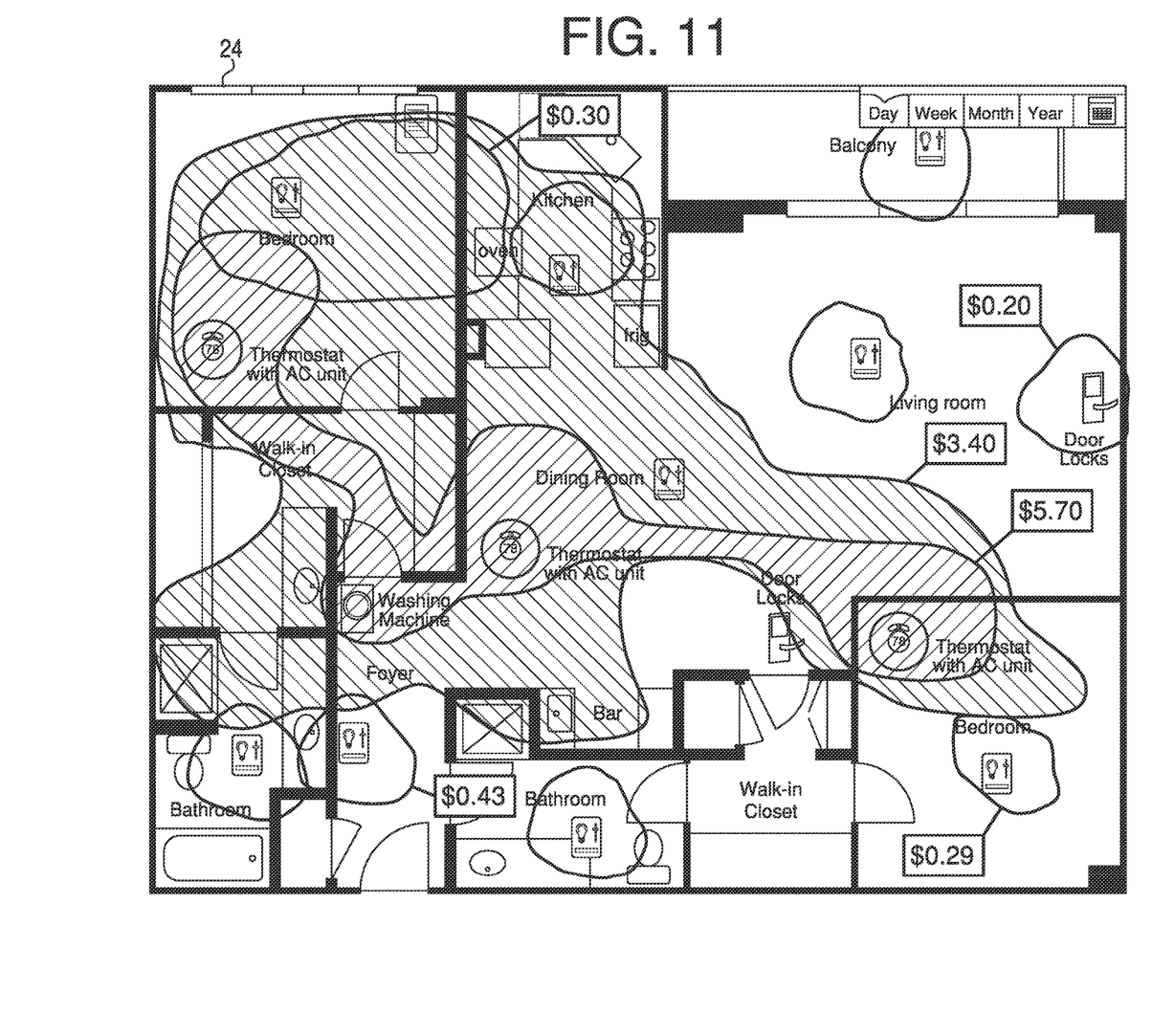
FIG. 11 is a diagram of a heat map visualization screen.
Figure 12:
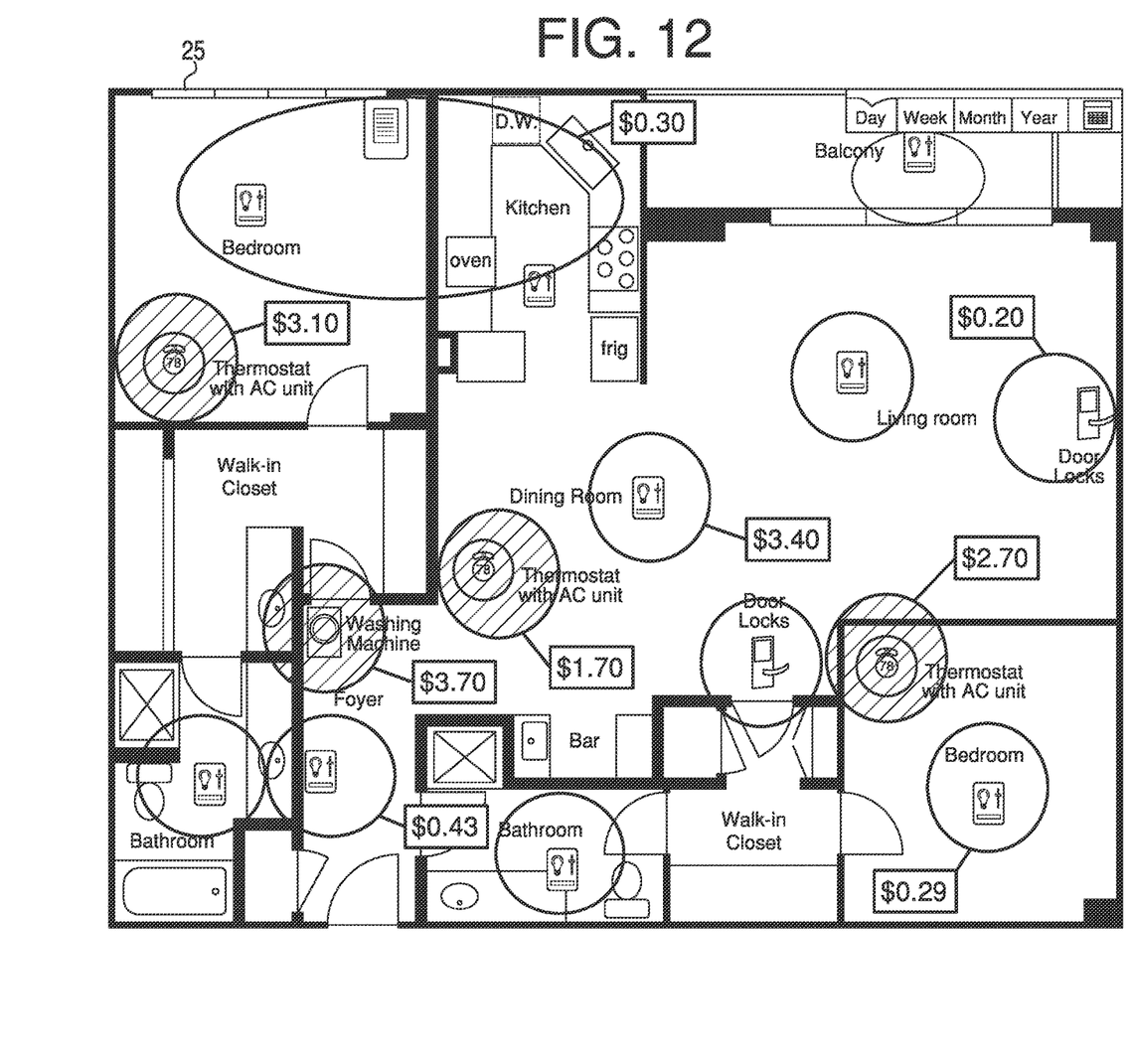
FIG. 12 is a diagram showing energy consumption details on the floor map with a heat map visualization screen.
Figure 13:
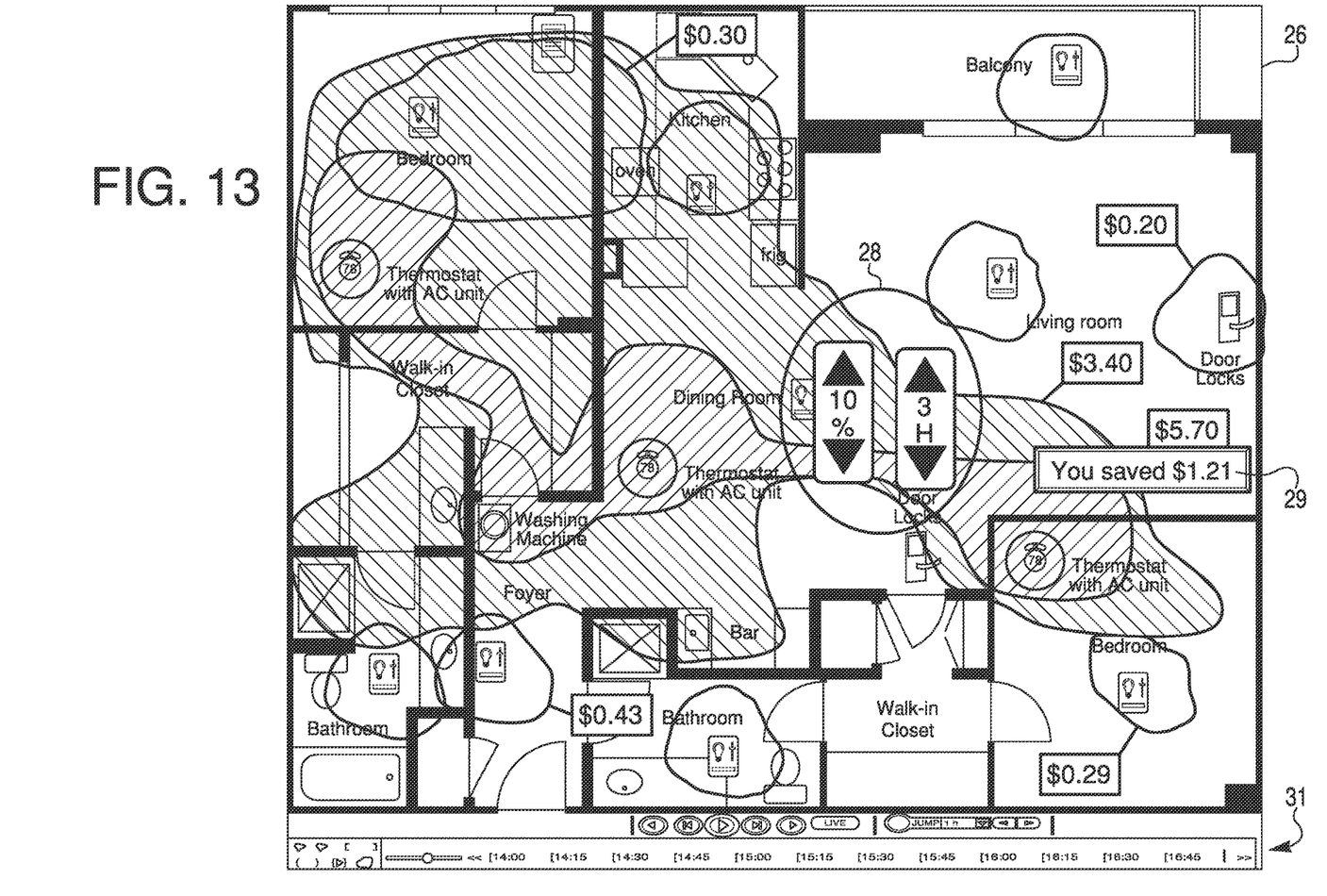
FIGS. 13 and 14 are diagrams of screens that show mechanisms for dynamically adjusting energy consumption in an area.
Figure 14:
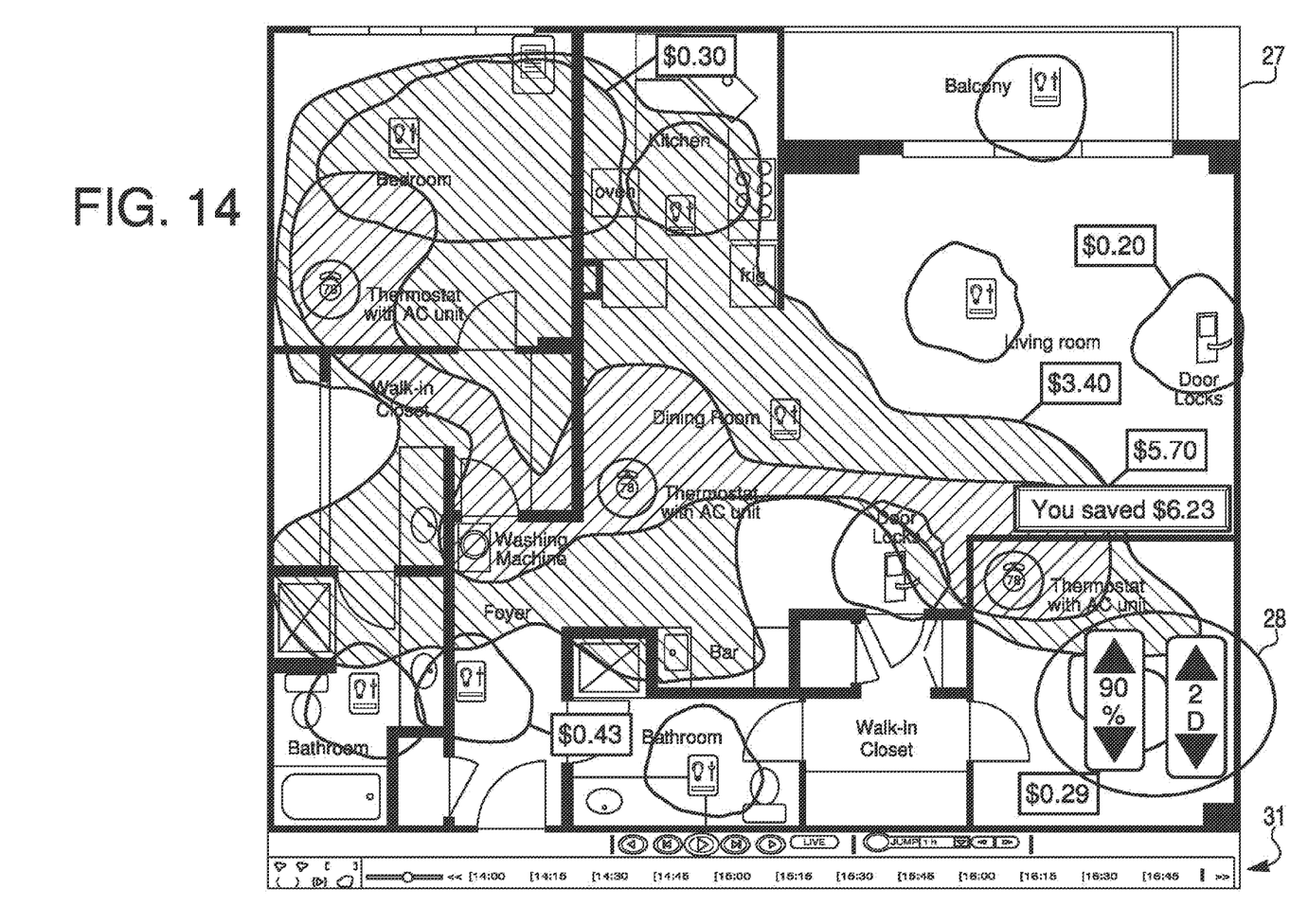

A solution visualization of the system may be described as a user selects an intended floor map 21 in a display of a smart phone or tablet 22 shown in a diagram of FIG. 8, that may configure devices on floor map 23 of FIG. 9 from a device list, get energy consumption details on floor map 23 of FIG. 10 with a heat map visualization screen 24 of FIG. 11, get energy consumption details on the floor map with a heat map visualization screen 25 in FIG. 12, dynamically adjusts/reduces energy consumption screen 26 in FIG. 13, and dynamically adjusts/reduces energy consumption screen 27 in FIG. 14. Screens 21 and 23-27 may be presented on a display of a smart phone 22, tablet or the like. Screens 24-27 may show costs of energy consumption for the various devices.

The user may select the intended floor map in screen 21 of FIG. 9. The user may select his/her home's floor map as a visual input to configure devices. The map may be any visual reference that user for a house (2D, 3D, image CAD file, and so forth).

Configuring devices may be noted on a floor map in screen 23 from a device list. A user may drag drop a device and sensors from a list onto the floor map based on a physical location of the devices and sensors such as, door and window sensors, window blinds, door locks, lights, thermostat with cooling and heating units, garage door controls, power points using binary switches (refrigerator, fan, electric iron, water heater, washing machine), cameras, smoke/gas detectors, and so forth.

Energy consumption details may be noted on a floor map with heat map visualization of screen 24. The borders of various levels of consumption are rough lines reflecting an actual difference between areas in terms of energy consumption. Energy consumption by category (high, medium, low) or by device may be visualized by day or week or month or year energy consumption may be shown as currency value like dollars ($) or by "watt-hours per day" or "kWh per day".

Energy consumption details may be noted on a floor map with heat map visualization of screen 25. The lines reflecting the differences of energy consumption are smoothed into geometrical changes such as circles, ovals and the like. Energy consumption by category (high, medium, low) or by device may be visualized as in screen 24

One may dynamically adjust/reduce the energy consumption, as shown in screen 26 of FIG. 13. Screen 26 resembles screen 24, except it has an energy consumption adjuster 28 along with a savings indication 29. Adjuster 28 may be set for a ten percent reduction of energy consumption for three hours. It may show and hide the savings that can be achieved by doing the dynamic and time based changes on adjuster 28. It is like showing money that will be saved with energy consumption changes.

On selecting each group or device, there may be two options, one to reduce/adjust the consumption by a percentage and the other option to set it by time in hours/days (like the setting is applicable for next 3 hours or 1 day, or the like).

A timeline 31 can be shown on the map view, as in screens 26 and 27, and upon selecting the different time of the day, the heat map may get updates in that a user can clearly see the trend of a day, and similarly timeline 31 can be extended to days, weeks, month, year and so on.

A dynamic adjust/reduce the energy consumption screen 27 is shown by the diagram of FIG. 14. Screen 27 can resemble screen 26 except adjuster 28 may have a different reduction of energy setting and be in another area of a home with a different rate of energy consumption. Also, a time setting for the energy consumption may be made. Indicator 29 may reveal a new monetary savings.

For instance, a user may define a virtual zone on the floor map of screen 27 and reduce ninety or one hundred percent for next two days. Here, the use case may be a certain part of house that will not necessarily be used for next two days due to the offspring being gone on for vacation, or some maintenance activity going on at the house or the like.

With a visual indication, a user may differentiate a change in the pattern as the details are shown on floor map. For example, usually just thermostat (heating and cooling) use may take more energy consumption than normal in a day but then suddenly, the map may show a lighting area taking more energy (red area in heat map) which could indicate a possible insulation issue, a faulty device, or so on.

The present system may be extended to any structure like hotels, corporate buildings, apartments, commercial buildings, and so forth.

The system may provide recommendations to optimize energy consumption by sending notifications, such as SMS or e-mail.

Visualization and optimization controls may be done from a mobile device such as a smart phone, tablet, web portal, desktop system, a wearable device, an intrusion panel/keypad (e.g., tuxedo™), and the like.

The present system may provide an option for flexible schedules based on the need. The system may aim to visualize energy consumption by households and give a dynamic options and recommendations to control them.

Dynamic grouping of devices may optimize energy. Instantly, a user may sense a change of energy consumption and take preventive actions. Visualization may help the user to see energy consumption patterns and cost details of each device so that a user can plan energy usage. The visualization may be easy to implement, as it may require a simple software change that most of the eco systems could use.

The present system may add a competitive advantage to all offerings like Value Net™, Total Connect™, evohome™, Lyric™, tuxedo™, and so on. The system may also be extended to offerings like DRAS, EBI, and so forth.

The present system may work by visualizing energy consumption by individually connected home devices, or by zone on the interactive floor map and may give an option to a user to dynamically adjust, such as reduce, energy consumption by percentage and by time.

The present system may be based on an intrusion detection system, home automation system and connected home system, and it can be made into practice in the Value Net, Total connect, evohome, Lyric, tuxedo products/services and solution can also be extended to offerings like DRAS, EBI, and so on.

System features may be noted. The system may visualize the energy consumption by devices on a user's home floor plan. The system may give an option to a user to make the energy optimization actions instantly and dynamically. The system may give full control to a user on taking any energy optimization actions instead of forcing the settings in the system. The system may give a feedback on the saving that is going to happen based on the correction that the user did. The system may allow a user to define a virtual zone on the floor map to take action for energy optimization. The system may show a timeline and playback controls on the visualization map view.

To recap, a mechanism for monitoring and controlling energy consumption, may incorporate one or more devices configured on a floor map, a monitor that detects energy consumption by each of the one or more devices, an energy consumption map shown on the floor map, a processor, and a user interface having a display connected to the processor. The energy consumption map may indicate amounts of energy consumption in various areas of the floor plan. The floor map with the energy consumption map may be a screen showable on the display.

The energy consumption by each of the one or more devices from the monitor may be calculated by the processor in terms of time that each device is active and in terms of a power rating of the respective device. The energy consumption by each of the one or more devices may be converted by the processor into cost.

The cost for each device of the one or more devices may be shown on the floor map.

The cost of energy consumption of the one or more devices may be shown in terms of one or more zones encompassing one or more devices, respectively.

An entry into the processor to change energy consumption of a device or a region of devices by a predetermined proportion, may cause the processor, which receives input about energy consumption from the monitor and provides an output to control the devices, to optimize energy consumption at the pre-determined proportion.

Control of devices may be selected from a group of actions incorporating adjusting setpoints of one or more thermostats, dimming and turning on and off lights, changing a speed of one or more fans, and controlling sensors, window blinds, door locks, garage door controls, refrigerator, electric iron, freezer, water heater, washing machine, cameras, smoke/gas detectors, clothes dryer, dishwasher, microwave oven, stove, water filtration system, water pump, coffee maker, toaster, waste grinder, televisions, intrusion detectors, actuators, devices attached to a binary switch, and remotely controllable switches.

The processor may indicate via the display what actions were effected for optimization of energy consumption by the predetermined proportion.

An approach for controlling energy consumption, may incorporate selecting a floor map of a building as a visual input to configure devices, configuring devices to be placed on the floor map from a device list, dragging and dropping the devices from the device list based on a physical location of actual devices of the floor plan, determining energy consumption on the floor plan with a heat map visualization, and dynamically adjusting the energy consumption with settings of the devices. The heat map may show an amount of savings achieved by dynamically adjusting the energy consumption.

The approach may further incorporate selecting a group of devices for which energy consumption may be adjusted by a pre-determined percentage of decrease or increase of energy consumption.

An adjustment of energy consumption may be set according to a time of start and finish.

The times of start and finish may be uniform for some time periods and non-uniform for other time periods.

The approach may further incorporate defining a virtual zone on the floor map, and reducing energy consumption X percent for a duration of time for the virtual zone.

The approach may further incorporate differentiating a change in pattern on the heat map of the floor map visualization. If the change in pattern is unanticipated, a check for a cause of the change may be sought.

A system for controlling energy consumption may incorporate a visualization of energy consumption on a floor map, and a mechanism connected to devices in a building configured on the floor map. The floor map may show a heat map to indicate energy consumption in different parts of the building according to the devices in the building. Energy consumption may be calculated by the mechanism for different parts of the building.

Energy consumption may be expressed in power used per unit time or by cost in terms of a currency.

A heat map region may be selected and its energy consumption may be defined by percentage and time.

A user may determine that energy consumption be reduced by X percent. The mechanism, in response to the determined reduction of consumption energy, may change setpoints of lights, thermostats and other energy consuming devices in an optimal fashion. X may be a number.

The heat map may incorporate a timeline which records heat map data through a set period of time. The heat map from data over time may reveal trends and changes on the floor map.

The mechanism may show savings that can be achieved by dynamic and time based adjustments.

The optimization mechanism may generate recommendations or notifications for optimizing energy consumption.

The mechanism may be monitored and controlled with a mobile device and a cloud platform. The mobile device may be selected from a group incorporating a smart phone, tablet, web portal, desktop system, a wearable device, and an intrusion panel/keypad.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for controlling energy consumption in a commercial building, the method comprising:
    receiving input via a user interface to adjust energy consumed in an area of the commercial building by a percentage for a set period of time, the energy consumed in the area is energy consumed by a set of devices associated with the area and operating at set points;
    in response to receiving the input, determining an energy consumption configuration for the set of devices such that the energy consumed in the area meets the percentage adjustment of the energy consumed for the set period of time, the energy consumption configuration includes optimized settings of the set points for the set of devices to meet the percent adjustment of energy consumed over the set period of time;
    automatically adjusting the set points of the set of devices according to the energy consumption configuration determined; and
    after automatically adjusting operation set points of the set of devices, displaying a map of the commercial building on a display such that a display of the area shows that the energy consumed in the area is equal to the percent adjustment of energy consumed over the set period of time.

2. The method of claim 1, further comprising:
    receiving input defining a virtual zone of the commercial building; and
    wherein the virtual zone is the area.

3. The method of claim 1, wherein the map is sectioned into a set of zones and the area includes one or more zones of the set of zones.

4. The method of claim 1, wherein energy consumed in the area is shown for a selected time along a timeline on the map.

5. The method of claim 1, further comprising determining energy consumed by the set of devices.

6. The method of claim 5, further comprising displaying the energy consumed by the set of devices as the energy consumed by the set of devices per day, and wherein the energy consumed by a device of the set of devices is determined based on a time during which the device is active and a power rating for the device.

7. The method of claim 1, wherein the input received via the user interface for the set period of time further includes:
a time at which the energy consumption configuration for the set of devices is to start such that the energy consumed in the area meets the percentage adjustment of the energy consumed for the set period of time; and
a length of time for which the set of devices are to operate using the energy consumption configuration such that the energy consumed in the area meets the percentage adjustment of the energy consumed for the set period of time.

8. The method of claim 1, further comprising:
generating, on a display, a recommendation to optimize the energy consumed in the area; and
the input via the user interface to adjust the energy consumed in the area of the commercial building by the percentage for the set period of time includes an acceptance of the recommendation.

9. A device for controlling energy consumption in a commercial building, the device configured to:
display, on a display device, a recommendation to optimize energy consumed in an area of the commercial building to adjust energy consumed in the area of the commercial building by a percentage for a set period of time;
receive input via a user interface accepting the recommendation; and
in response to receiving the input, dynamically adjust operation set points of one or more devices to adjust the energy consumed in the area of the commercial building by the percentage for the set period of time according to the recommendation; and
after dynamically adjusting operation set points of the one or more devices, generate and display a map of the commercial building on a display such that a display of the area shows that the energy consumed in the area is equal to the percent adjustment of energy consumed over the set period of time.

10. The device of claim 9, further configured to receive input defining a virtual zone of the commercial building, the virtual zone is the area.

11. The device of claim 9, further configured to determine energy consumed by the one or more devices.

12. The device of claim 11, wherein the energy consumed is shown as the energy consumed by the one or more devices per hour.

13. The device of claim 11, wherein the energy consumed is shown as the energy consumed by the one or more devices per day.

14. The device of claim 11, wherein the energy consumed is shown as an amount of money it takes for the one or more devices to operate.

15. The device of claim 9, wherein the set period of time includes:
a time at which the operation of the one or more devices is to be adjusted such that the energy consumed by one or more devices meets the percentage adjustment of the energy consumed for the set period of time; and
a length of time that the one or more devices are to operate such that the energy consumed by the one or more devices meets the percentage adjustment of the energy consumed for the set period of time.

16. A system for controlling energy consumption in a commercial building, the system comprising:
one or more devices located in a first area of the commercial building; and
a device configured to:
receive input via a user interface of the device to adjust energy consumed in the first area by a percentage for a set period of time, the energy consumed in the first area is energy consumed by one or more devices associated with the first area and operating at set points;
in response to receiving the input, determine an energy consumption configuration for the one or more devices such that the energy consumed in the first area meets the percentage adjustment of the energy consumed for the set period of time, the energy consumption configuration includes optimized settings of the set points for the set of devices to meet the percent adjustment of energy consumed over the set period of time;
automatically adjust the set points of the one or more devices according to the energy consumption configuration determined; and
after automatically adjusting the set points of the one or more devices, displaying a map of the commercial building on a display such that a display of the first area shows that the energy consumed in the first area is equal to the percent adjustment of energy consumed over the set period of time.

17. The system of claim 16, the device further configured to determine the energy consumed by the one or more devices.

18. The system of claim 16, wherein the input received via the user interface for the set period of time further includes:
a time at which the energy consumption configuration for the one or more devices is to start such that the energy consumed in the first area meets the percent adjustment of energy consumed over the set period of time; and
a length of time for which the one or more devices are to operate using the energy consumption configuration such that the energy consumed in the first area meets the percent adjustment of energy consumed over the set period of time.

19. The system of claim 16, the device further configured to:
generate, on a display, a recommendation to optimize the energy consumed in the first area; and
the input via the user interface to adjust the energy consumed in the first area of the commercial building by the percentage for the set period of time includes acceptance of the recommendation.

* * * * *